WIDE-BAND AMPLIFIER
Filed May 26, 1950
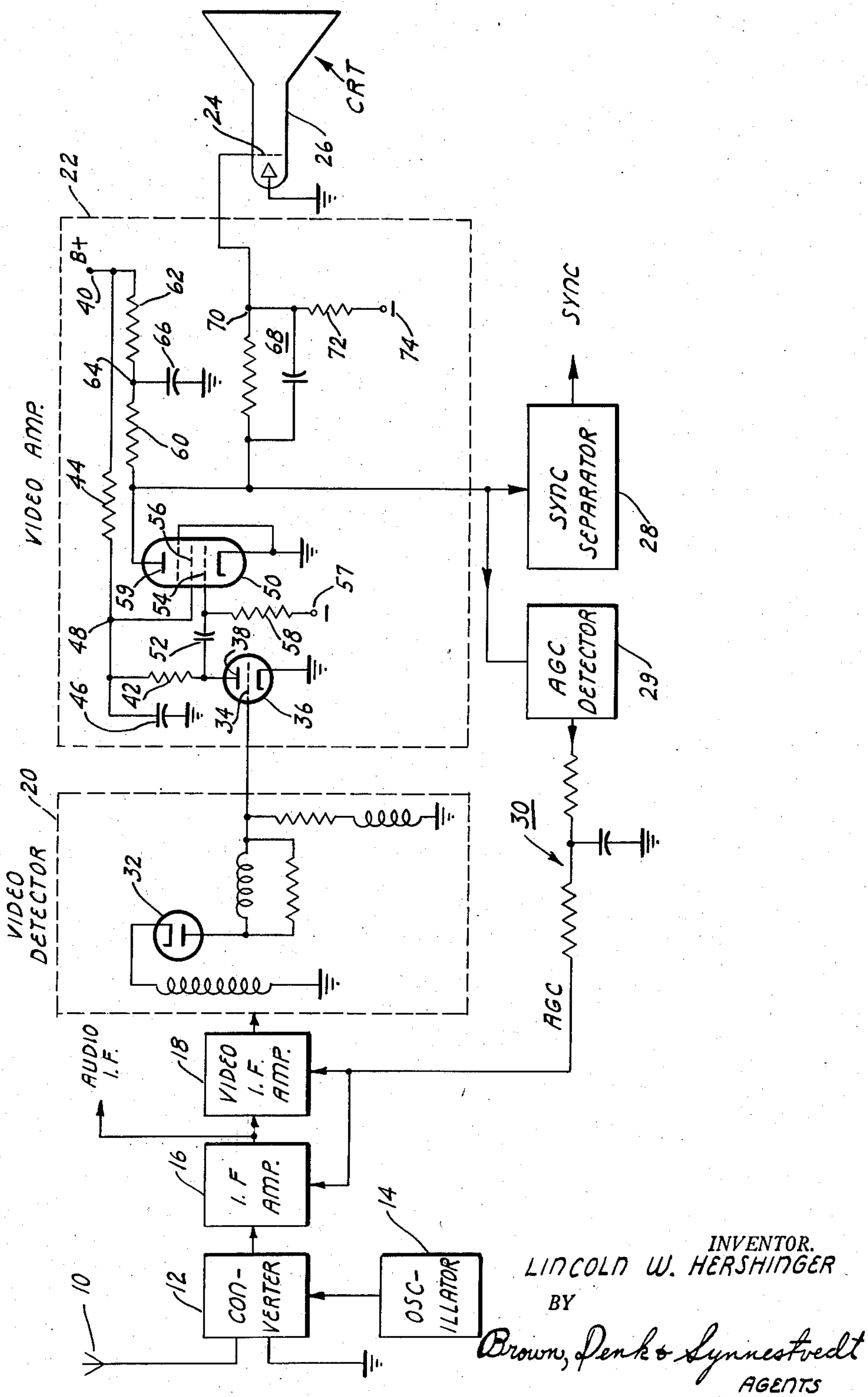
INVENTOR.
LINCOLN W. HERSHINGER
BY
Brown, Denk & Synnestvedt
AGENTS Patented Nov. 13, 1951

2,574,828

UNITED STATES PATENT OFFICE 2,574,828

WIDE-BAND AMPLIFIER

Lincoln W. Hershinger, Oreland, Pa., assignor to Philco Corporation, Philadelphia, Pa., a corporation of Pennsylvania Application May 26, 1950, Serial No. 164,452

1 Claim. (Cl. 179—171)

The present invention relates to a high-gain multi-stage video amplifier capable of passing frequencies down to and including direct current. It is particularly suited for use in television receivers where it is desired to retain the D.-C. component of the video signal which is normally lost in conventional amplifiers employing resistance-capacitance coupling.

It is advantageous to incorporate in television receiving apparatus a series of amplifier stages which are designed so as to pass the D.-C. component present in the received video signal. This not only permits the usual D.-C. restoring circuit to be dispensed with, but in addition means that the synchronizing separator may be operated with a fixed bias. The result is a reduction in the number of components required, as well as a simplification of receiver operation. A still further advantage achieved by the use of a direct-coupled video amplifier is that the automatic gain control circuit may be connected to the output of the video amplifier instead of to the output of the video detector, thus giving a flatter AGC characteristic than is customarily obtainable.

While the benefits of direct-coupled video amplifiers have long been recognized, such circuits have not achieved wide popularity due to the fact that a number of drawbacks have heretofore been inherent in their use. Perhaps the principal disadvantage has been that variations in the power supply of the receiver have caused corresponding variations in amplifier output. This is especially true, for example, in arrangements where the output voltage of one tube is applied directly to the control grid of the following tube. It has been found in such cases that not only are the component values quite critical, but also that small fluctuations in plate supply voltage result in an unbalance of the amplifier. Furthermore, this type of circuit places a relatively high D.-C. potential on the amplifier tube control grid, which may lead to distortions in the signal wave-form. Some of these factors might be overcome by the use of a separate power supply for each tube, or by the use of complex regulating equipment. However, these expedients would increase the cost of the television receiver to a prohibitive degree.

One object of the present invention, therefore, is to provide a high-gain direct-coupled video amplifier particularly adapted for television purposes.

Another object of the present invention is to provide a wide-band multi-stage amplifier circuit wherein the A.-C. and D.-C. components of the input signal are transmitted through the amplifier by different paths.

A further object of the present invention is to provide a direct-coupled video amplifier suitable for use with input signals which include a D.-C. component, and to provide means for establishing the A.-C. gain of the circuit substantially independently of the D.-C. gain whereby a substantially balanced condition may be reached.

Other objects and advantages will be apparent from the following description and from the drawing, the single figure of which illustrates a television receiver incorporating a preferred form of video amplifier designed in accordance with the present invention.

Referring now to the drawing, there is shown a television receiver of the superheterodyne type. This receiver includes an antenna 10 which is connected to the input terminal of a converter 12. The latter also receives the output of a local oscillator 14, which beats with the incoming energy received by antenna 10 to develop an intermediate frequency (IF) signal. This signal is then fed to an IF amplifier 16.

The output of the IF amplifier 16 contains both the audio and video information present in the composite television signal. The audio information is segregated by any suitable type of separating circuit (not shown) and applied in the usual manner to an audio reproducing apparatus. The remaining portion of the signal passes through a video IF amplifier 18 and is delivered to a video detector 20. The latter acts to demodulate the picture information, which is then applied by way of a multi-stage video amplifier 22 to the grid 24 of an image-reproducing cathode-ray tube 26. A synchronizing separator circuit 28 is also connected to the video amplifier 22, so that the horizontal and vertical synchronizing pulses contained in the composite video signal may be separated therefrom and utilized to control line and field deflection of the electron scanning beam of the cathode-ray tube 26 through the action of the usual scanning generators (not shown). Furthermore, an AGC potential is derived from the output of the video amplifier 22 and applied by way of an AGC detector 29 and a conventional filter circuit 30 to the IF amplifier units 16 and 18 so as to control their gain in some suitable manner.

In describing the present invention, it will be assumed that the composite television signal, including both video information and synchronizing pulses as well as a D.-C. component, has passed through the IF amplifier 16 and the video amplifier 18 and is received by the video detector 20. This circuit acts in a more or less standard fashion to demodulate the video signal through the action of a diode detector tube 32, with the synchronizing pulses extending in a direction of negative polarity. This detected signal is then applied to the control grid 34 of a triode 36 forming part of the video amplfier unit 22.

The triode 36 has its anode 38 connected to the terminal 40 of a positive potential source through two resistors 42 and 44. The resistor 44 acts as a D.-C. load for the triode 36, and hence is by-passed to ground for the A.-C. components of the output signal by means of a capacitor 46. Since the junction point 48 of the resistors 42 and 44 is at A.-C. ground potential, the only voltage variation appearing at this point represents changes in the D.-C. component of the output signal from triode 36. The resistor 42, however, acts as a load for the A.-C. component of the signal, and hence the A.-C. signal voltage may be derived from the anode 38 of the triode.

The A.-C. and D.-C. components of the signal output of triode 36, which, as above stated, appear respectively at the anode 38 and at the 48 point between the resistors 42 and 44, are conducted by separate paths to a pentode 50. The A.-C. components of signal voltage pass through a capacitor 52 to the control grid 54 of the pentode, while the D.-C. voltage variations are applied directly to its screen grid 56. Control grid 54 is returned through a grid resistor 58 to a source of negative potential connected to the terminal 57. Anode 59 of the pentode is connected to terminal 40 of the operating potential source through two resistors 60 and 62, the junction point 64 of these resistors being grounded through the capacitor 66. The D.-C. plate load of pentode 50 is constituted of both the resistors 60 and 62 in series, while the A.-C. plate load comprises only the single resistor 60. Anode 59 of pentode 50 is further connected to the control grid 24 of the cathode-ray tube 26 through a parallel resistance-capacitance network 68. Operating bias for the cathode-ray tube grid 24 is supplied from point 70 on a voltage-divider network consisting of the resistors 62, 60, the resistor of the RC network 68, and a further resistor 72 all connected in series between positive terminal 40 and the terminal 74 of a source of negative potential.

It will thus be seen that the output voltage of the triode 36 is applied to the pentode 50 over two separate paths, the A.-C. components in the signal being applied to the control grid 54 of the pentode from the anode 38 of the triode through the capacitor 52, and the D.-C. component in the signal being applied directly to the screen grid 56 of the pentode from the point 48. This method of coupling the two tubes 36 and 50 eliminates the necessity of operating the pentode control grid 54 at a high positive potential, and furthermore allows separate output loads to be employed both for the triode 36 and for the pentode 50 such that the entire circuit may be brought into balance for the two signal components. This will be accomplished when the A.-C. gain of the amplifier 22 is substantially equal to its D.-C. gain, and can be obtained, for example, by making the value of the D.-C. load resistor 62 sufficiently high so that the D.-C. amplification of the pentode 50 is sufficient to match the overall A.-C. gain of the amplifier as developed across resistor 60. The latter may reach a figure of approximately 100 when the following values are employed for the components indicated:

Resistor 42=3300 ohms
Condenser 44=8 microfarads
Resistor 44=39,000 ohms
Condenser 52=.2 microfarad
Resistor 60=3900 ohms
Condenser 66=8 microfarads
Resistor 62=12,000 ohms
Triode 36=Type 12AT7
Pentode 50=Type 6MQ5
Resistor 58=220,000 ohms
Potential at terminal 40=+300 volts
Potential at terminal 57=−6 volts
Potential at terminal 74=−300 volts It will of course be understood that the principles of applicant's invention as exemplified by the video amplifier 22 may be utilized in other networks and for other applications than the one illustrated and described. The concept can advantageously be employed in a wide variety of circuit arrangements in which an intelligence signal having a D.-C. factor is to be passed with equally high gain for each of its components.

Having thus described my invention, I claim:

An amplifier comprising first and second electron discharge tubes, the first of said tubes having at least a cathode, an anode, and a grid, the second of said tubes having at least a cathode, an anode, and first and second grid electrodes, means for applying to the grid-cathode circuit of said first tube an electrical signal having both A.-C. and D.-C. components, a pair of load resistors and a source of anode current serially connected in the anode-cathode circuit of said first tube, a by-pass capacitor connected between a point of fixed potential and the junction between said load resistors, means including a capacitor connected between the anode of said first tube and the first grid of said second tube for applying the A.-C. output voltage of said first tube to the first grid-cathode circuit of said second tube, means including a conductive connection between said second grid of said second tube and the junction between said serially-connected load resistors for applying the D.-C. voltage present across one only of said resistors to the second grid-cathode circuit of said second tube, a frequency-compensating load arrangement for said second tube comprising a second pair of load resistors and a source of anode current serially connected in the anode-cathode circuit of said second tube, a by-pass capacitor effectively connected in shunt with one only of said load resistors, and means for deriving a compensated output signal from the series combination of said second pair of load resistors.

LINCOLN W. HERSHINGER.

REFERENCES CITED

The following references are of record in the file of this patent:

UNITED STATES PATENTS

| Number | Name | Date |
|---|---|---|
| 2,211,914 | Soller | Aug. 20, 1940 |
| 2,307,387 | Blumlein | Jan. 5, 1943 |
| 2,434,939 | Levy | Jan. 27, 1948 |
| 2,541,198 | Brenholdt | Feb. 13, 1951 |